UNITED STATES PATENT OFFICE.

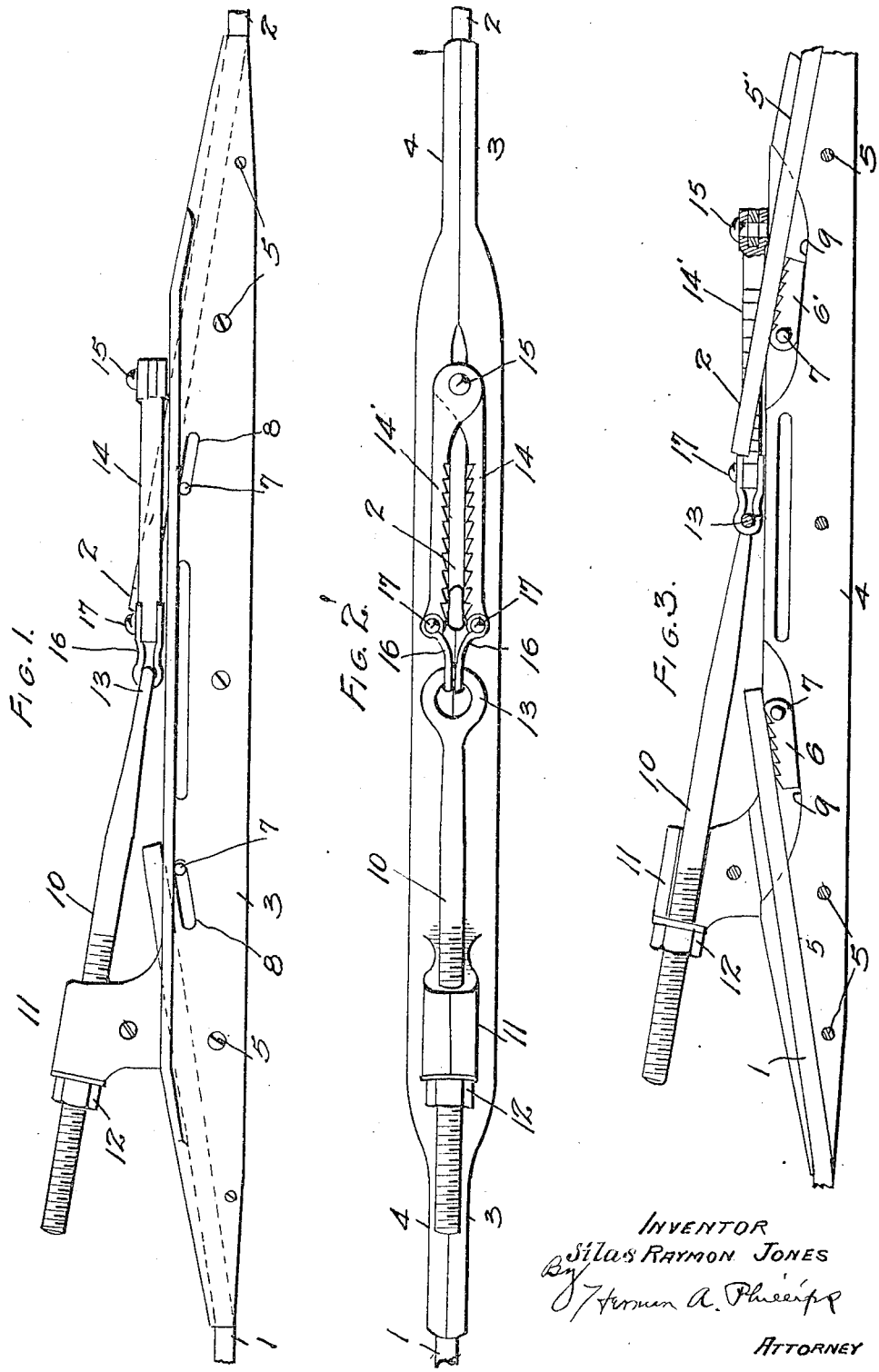

SILAS RAYMON JONES, OF COEBURN, VIRGINIA, ASSIGNOR OF ONE-HALF TO CLINTON M. WOLFE, OF COEBURN, VIRGINIA.

WIRE-SPLICE.

1,291,538.  Specification of Letters Patent.  Patented Jan. 14, 1919.

Application filed June 19, 1918. Serial No. 240,876.

*To all whom it may concern:*

Be it known that I, SILAS RAYMON JONES, a citizen of the United States, residing at Coeburn, in the county of Wise and State of Virginia, have invented certain new and useful Improvements in Wire-Splices, of which the following is a specification.

The present invention relates to improvements in wire splices for use in connecting the ends of electricity conductors used on electric or trolley railways, or to connect wire ends that are being used for other electrical purposes, the primary object of the invention being the provision of a device of this character that is comparatively inexpensive in cost of production, but attains a maximum of efficiency in performing its functions, as it may be applied for use with great facility and is practically permanent in its durability for use.

In the accompanying drawings one complete example of the physical embodiment of the invention is illustrated, constructed and arranged according to the best mode so far devised for the practical application of the principles of the invention.

Figure 1 is a side elevation of a wire splice embodying the present invention.

Fig. 2 is a top plan view of the device.

Fig. 3 is a sectional view of the splice, one section being removed, showing the interior arrangement of parts.

In order that the invention may be readily comprehended I have illustrated two broken ends of an electric trolley wire as used upon electric overhead railways, the wire ends being indicated as 1 and 2 and these ends are joined by means of the splice device, to form a continuous connector for the conductors of electricity.

Preferably the splice is made up of two sections 3 and 4, of suitable length and shape and connected by screws or bolts 5, 5, and recessed at the ends as indicated by the numerals 5' to receive the ends 1 and 2 of the wire. The wire ends are bent at their juncture with the splice and they extend toward each other, with an upward incline from the ends of the splice, through the recesses 5' 5', being frictionally held to some extent, by the screws 5 that clamp the two sections of the splice together. The wire ends are held positively, however, within the splice by means of wedges or locking keys 6, 6' that are each formed with teeth on their upper edges to engage against the wire ends. The wedges are fashioned with guide pins 7 that project laterally therefrom and move in the lateral slots 8, 8 of the splice sections, while the wedge itself is in frictional contact with a friction face 9 of the recess in which the wedge or locking key is located. Thus, the tendency of the wire end 1, for instance, to pull out of the recess 5' will have the effect of drawing the wedge 6 with it, and this movement causes the teeth of the wedges to bite in the wire and the wedge is locked between the wire and the cam face 9, securely holding the wire against withdrawal from the splice.

After the end 1 is secured, the slack in the wire is taken up and the connection made taut by means of the draw bar 10, which is a threaded bolt loosely supported in the sleeve 11 formed by the two halves of the splice, and provided with a lock nut 12 and a forward or end eye 13. The pivoted pulling links 14 and 14' are provided with teeth that bite in to the sides of the wire end 2, and these links are pivoted together at 15, and their free ends being connected to the eye 13 by means of a pair of bails 16 that are pivoted on the links at 17. The pull links and bails are loose on the eye of the bolt 10, but it will readily be seen that when the links are clasped over the end of the projecting wire 2 and the nut 12 turned, the bolt will draw on the bails causing the teeth of the links to bite the wire end and draw the end through its recess 5'. thus making taut the connection and holding, together with the wedge 6', the wire end securely.

Claims:

1. The combination in a wire splice having slots and recesses for the bent wire ends, of cam wedges formed with guide pins engaging in said slots and adapted to lock the ends within the splice.

2. The combination in a device for stretching wire ends including a member for retaining an end of the wire, of a tension device for taking up slack of the other wire end comprising a pair of pivoted links adapted to clasp the wire end, a threaded bolt supported in the device and an operating nut therefor, and said bolt having an end eye and pivoted bails connecting said eye and the free ends of the pivoted links.

3. The combination in a device for connecting and stretching wire ends of a splice member with means for retaining one end of a wire, of a tension device comprising a pair of pivoted clasping links to operatively engage the other wire end, and operating means connected to said links for drawing the wire taut and retaining it in this condition.

4. The combination in a device for stretching and connecting wire ends, of a splice member having a recess and a locking wedge in said recess for engaging one end of the wire, of a pair of pivoted friction links engaging the other end of the wire, a pair of bails pivoted at the free ends of the links, and an eye bolt and nut connected to said bails as described.

In testimony whereof I affix my signature.

SILAS RAYMON JONES.

Copies of this patent may be obtained for five cents each, by addressing the "Commissioner of Patents, Washington, D. C."